Aug. 5, 1924.

F. W. THOMPSON

GRADE METER

Filed April 15, 1921

WITNESSES

INVENTOR
F. W. THOMPSON,
BY
ATTORNEYS

Aug. 5, 1924.                                1,503,672
             F. W. THOMPSON
               GRADE METER
        Filed April 15, 1921      2 Sheets-Sheet 2
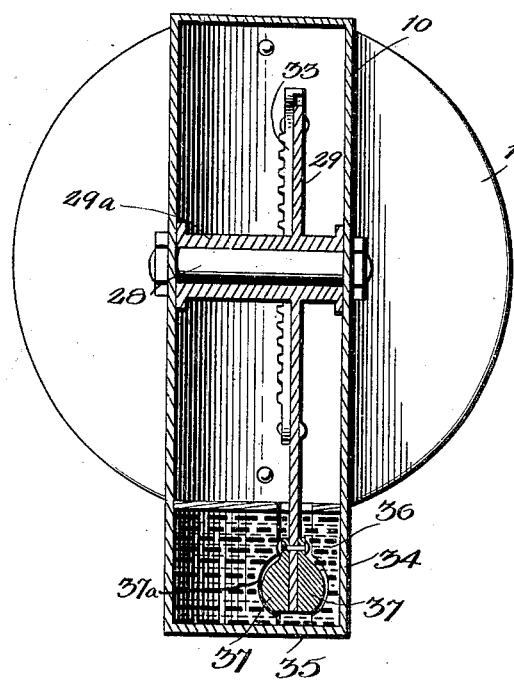
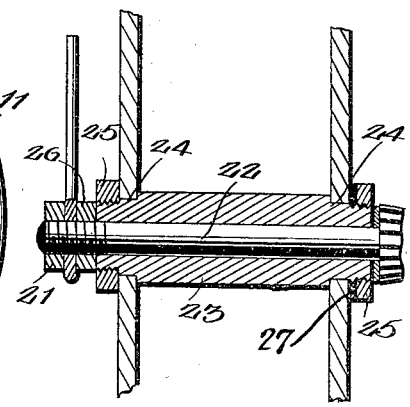
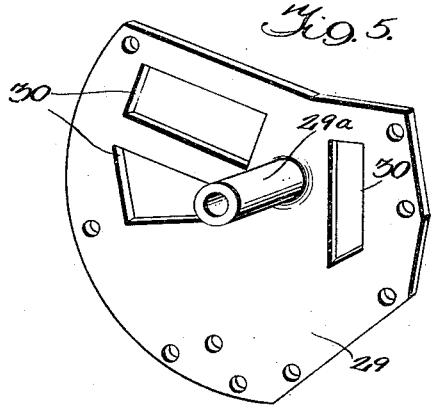
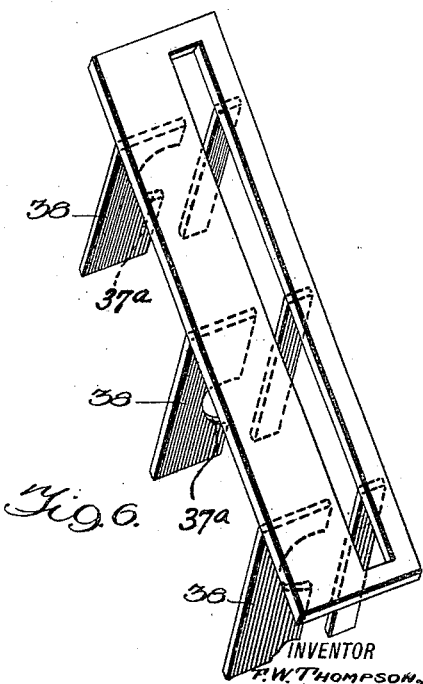

Patented Aug. 5, 1924.

1,503,672

UNITED STATES PATENT OFFICE.

FRED WM. THOMPSON, OF PALMS, CALIFORNIA, ASSIGNOR OF ONE-HALF TO BURT C. HUNNICUTT, OF LOS ANGELES, CALIFORNIA.

GRADE METER.

Application filed April 15, 1921. Serial No. 461,561.

*To all whom it may concern:*

Be it known that I, FRED WILLIAM THOMPSON, a citizen of the United States, and a resident of Palms, in the county of Los Angeles and State of California, have invented certain new and useful Improvements in Grade Meters, of which the following is a specification.

The present invention relates in general to grade meters, and more particularly to grade meters for use with vehicles.

The object of the invention is to provide a grade meter for use with land, water or air vehicles, such as automobiles, ships, aeroplanes or the like, which will afford an accurate indication of the grade, whether it be ascending or descending, which will not be affected by changes in the direction or rate of motion of the vehicle and which is of simple, durable and compact construction, reliable in operation, easy and inexpensive to manufacture and apply, and attractive in appearance.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 3 is a transverse vertical sectional view thereof, on line 3—3 of Figure 2, parts being shown in elevation for the sake of illustration;

Figure 4 is a detail view, partly in section and partly in elevation, of the bearing of the indicator and its associated structure;

Figure 5 is a detail perspective view of the control plate; and

Figure 6 is a detail perspective view, illustrating the baffle arrangement for stabilizing the oil.

Figure 1:
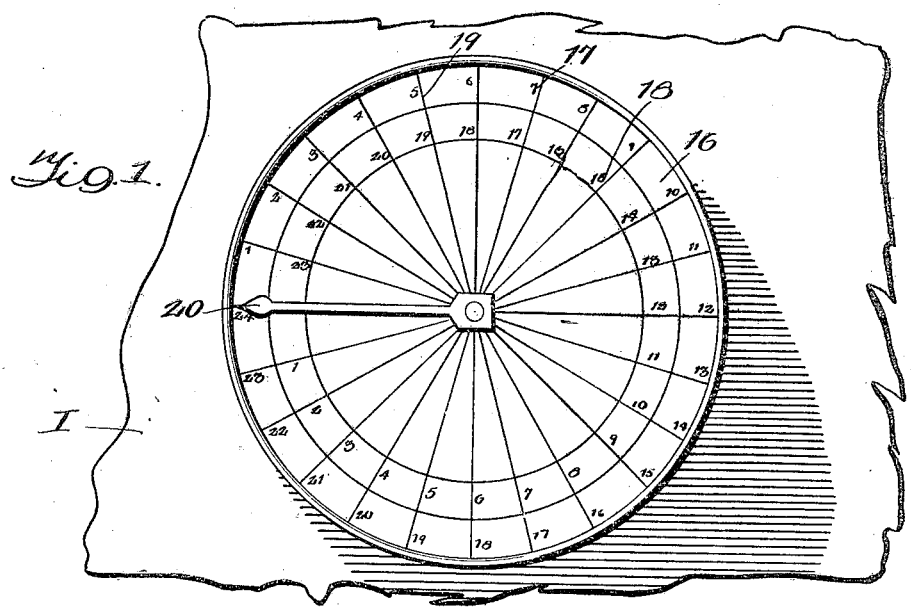
Figure 1 is a front elevational view of the grade meter.
Figure 2:
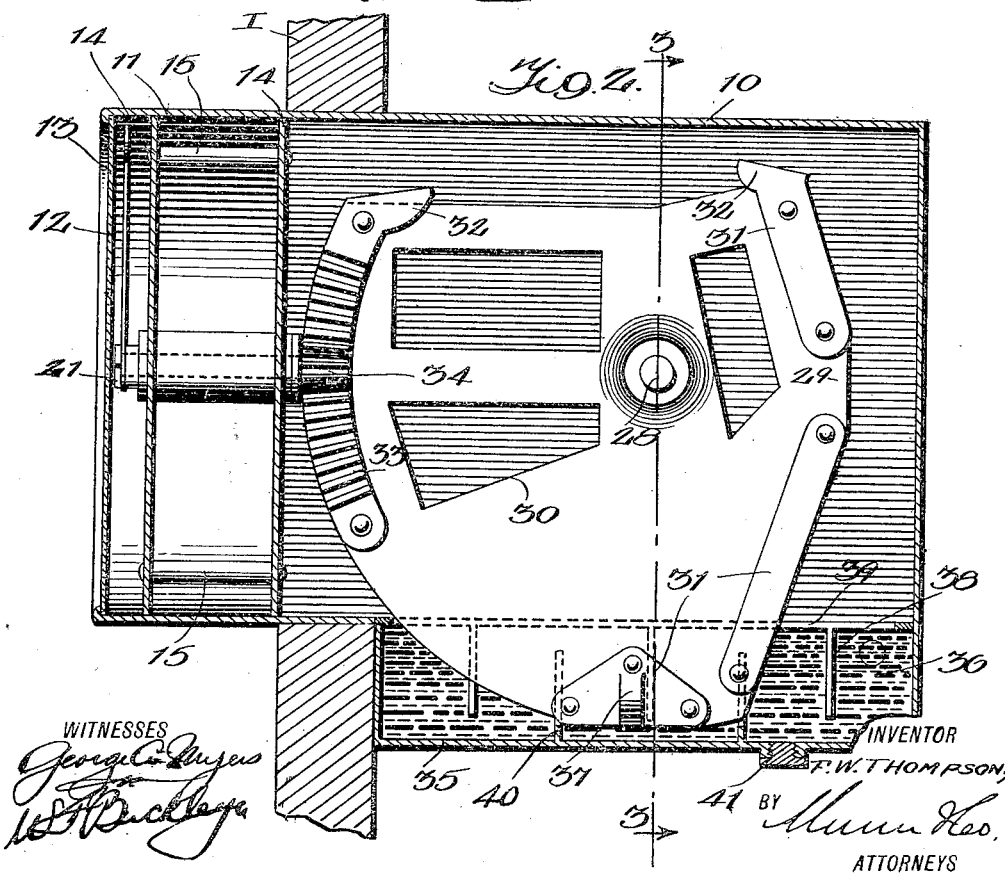
Figure 2 is a longitudinal vertical sectional view thereof, parts being shown in elevation for the sake of illustration.

Referring to the drawings wherein for the sake of illustration is shown the preferred embodiment of the invention, the numeral 10 designates generally a casing adapted to be associated with an instrument board, designated at I, which constitutes a stationary part of the vehicle.

The grade meter includes an indicator having a circular casing 11, integral or suitably secured to the casing 10, and having a window 12 therein. A circular panel 13 of glass or other transparent material extends across the window 12. A pair of spaced plates designated at 14 is arranged within the casing of the indicator and these plates are maintained in spaced relation by means of rivets or the like, indicated at 15. The exposed face of the outer of these plates has arranged thereon a chart 16 which lies adjacent to the window 12 and immediately behind the glass panel 13. The chart carries an outer and inner circumferential series of indicia, designated at 17 and 18, respectively which serve to indicate the degree of the grade. Preferably the outer series, designates the degree of the grade if it be an up-grade and an inner series designates the degree of the grade if it be a down-grade. Radial lines 19 divide the chart into a plurality of angular spaces and facilitate the reading of the indicia. A pointer 20 coacts with the chart to afford the indication of the grade. The pointer 20 is fixed by means of a nut 21 to the outer end of a rotatable shaft 22 (see Figure 4). The shaft 22 is rotatably journaled in a bushing 23 which extends between and is carried by the spaced plates 14 and which is provided with reduced extensions 24 extending through suitable openings provided therefor in the plates and retained in position by means of nuts 25 threaded on the reduced extensions and bearing against the plates. A nut 26 is threaded on the shaft 22 at the end thereof which carries the pointer and prevents longitudinal displacement of the shaft in one direction. A washer 27 is arranged on the shaft 22 at the opposite end from the pointer and is interposed between the bushing 23 and a gear 33 formed or fixed on the end of the shaft 22 and hereinafter fully described, and in this manner displacement of the shaft in the other direction is prevented.

Gravity controlled means is provided for governing or actuating the indicator and includes an arbor 28 carried by the casing 10, and a pivoted control plate 29 having a hub 29$^a$ rotatably mounted upon the arbor 28. The pivoted control plate is provided with cutaway portions 30 and with counterweights 31 to effect the proper balancing thereof. The provision of the counterweights and the cutaway portions makes it possible to use a control plate of the required mass and balance without the necessity of having a large and bulky structure. Stop lugs 32 are provided at the upper ends of the control plate and cooperate with the casing 10 to limit the movement of the control plate in either direction.

Motion transmission means is provided between the control plate and the rotatable shaft of the indicator and perferably consists of a segmental gear 33 fixed to the marginal edge of the control plate and a pinion 34 fixed to the adjacent end of the rotatable shaft of the indicator and meshed with the segmental gear 23 of the control plate.

Means is provided for retarding or dampening the action of the gravity controlled means and preferably comprises a reservoir or tank 34 carried by the lower end of the casing 10. The reservoir is filled or partly filled with oil or other fluid of suitable viscosity, designated at 36, and a portion of the control plate is immersed in the oil or fluid of the reservoir and operates therein. This oil or fluid presents a resistance to the motion of the control plate which affords the proper retarding or dampening action to prevent changes in the speed, or direction of motion of the vehicle from affecting the control plate. Preferably the control plate is provided with a lateral fin or projection 37 to increase the resistance offered to the motion of the control plate by the fluid. A plurality of spaced and staggered baffle plates 38 depend from a solid carrier or master plate 39 and coact with staggered upstanding baffle plates 40 carried by the bottom of the reservoir to stabilize the fluid itself within the reservoir. The master plate being solid and the baffles being spaced and staggered they do not interfere in any way with the motion of the control plate. The baffle plates arranged along one side of the control plate are provided with a series of openings or recesses 37ª to accommodate the lateral fin 37 in its motion. A plugged opening 41 is provided in the reservoir to facilitate the charging and replacing of the fluid.

In operation, after the grade meter has been placed on the vehicle it will serve to indicate with precision the degree of the grade, whether the grade be an up-grade or a down-grade. The control plate which is suspended so as to be controlled by gravity maintains the same relation with respect to the center of the earth and as the vehicle or other elements of the grade meter change their position relative thereto the relative motion will be transmitted in proper proportion to the pointer of the indicator and will therefore afford an indication of the character and the precise degree of the grade.

An important feature of the present invention resides in the means provided for retarding or dampening the action of the gravity control means. These means being necessarily of considerable mass, changes in the direction or degree of the motion of the vehicle upon which it is suspended tend to influence it so that it would incorrectly move the pointer and present a false or incorrect indication. In the present invention, however, this is prevented as the oil or other fluid operates upon the control plate and prevents motion of the control plate in response to the forces incident to changes in the direction or rate of motion which play upon the control plate, and permit the control plate to respond only to the action of gravity and to allow the casing to partake of the relative motion requisite to proper indication of the grade.

I claim:

1. In a grade meter, a casing, an indicator including a chart, a pointer coacting with the chart and a rotatable shaft carrying the pointer, gravity control means for governing the indicator including a pivoted control plate, motion transmission means between the plate and the shaft including a segmental gear fixed to the plate and a pinion fixed to the shaft and meshed with the segmental gear, means for retarding or dampening the action of said gravity control plate comprising a reservoir, having fluid therein in which a portion of said control plate is immersed and operates, and stop lugs carried by the control plate and engageable with the casing for limiting the motion of the control plate in either direction.

2. In a grade meter, a casing, an indicator, gravity controlled means for governing said indicator including a pivoted control plate having a lateral fin and means for retarding or dampening the action of said gravity control plate comprising a reservoir having oil or the like therein in which a portion of said control plate and the fin is immersed, and baffles for retarding movement of the oil in said reservoir said baffles having recesses therein to accommodate the motion of said fin.

3. In a grade meter, a casing, an indicator, gravity controlled means for governing said indicator including a pivoted control plate and means for retarding or dampening the action of said gravity control plate comprising a reservoir having oil or the like therein in which a portion of said control plate is immersed, and baffles for retarding movement of the oil in said reservoir.

4. In a grade meter, an indicator including a pair of spaced plates, a chart arranged upon the exposed face of the outermost of said plates, a bearing bushing carried by said plates, nuts securing said bushing in position, a rotatable shaft journaled in said bearing bushing, a pointer carried by one end of said shaft and coacting with said chart, and gravity controlled means cooperable with the other end of said shaft for governing said pointer.

5. In a grade meter, an indicator including a chart, a pointer coacting with said chart and a rotatable shaft carrying said pointer, gravity controlled means for governing said indicator including a pivoted control plate having cutaway portions and counterweights to effect the balancing thereof and motion transmission means between said control plate and said shaft.

FRED WM. THOMPSON.